(12) United States Patent
Hitaka et al.

(10) Patent No.: US 8,433,887 B2
(45) Date of Patent: Apr. 30, 2013

(54) SYSTEM AND METHOD FOR BOOTING DEVICE CORRESPONDING SOFTWARE IF IT DOES NOT CONFLICT WITH A PROGRAM CURRENTLY RUNNING WHEN A DEVICE IS CONNECTED TO AN INFORMATION HANDLING SYSTEM

(75) Inventors: Yosato Hitaka, Tokyo (JP); Kenji Hatori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 12/710,473

(22) Filed: Feb. 23, 2010

(65) Prior Publication Data

US 2010/0223451 A1 Sep. 2, 2010

(30) Foreign Application Priority Data

Mar. 2, 2009 (JP) ................................. 2009-048274

(51) Int. Cl.
*G06F 9/00* (2006.01)
*G06F 9/24* (2006.01)
*G06F 15/177* (2006.01)
*G06F 11/00* (2006.01)

(52) U.S. Cl.
USPC .................................. 713/2; 713/1; 714/100

(58) Field of Classification Search .................. 713/1, 2; 714/100
See application file for complete search history.

(56) References Cited

U.S. PATENT DOCUMENTS

| | | | | |
|---|---|---|---|---|
| 5,974,474 A * | 10/1999 | Furner et al. | ...................... | 710/8 |
| 6,412,084 B1 * | 6/2002 | Gardner | ........................... | 714/50 |
| 6,487,522 B1 * | 11/2002 | Smith et al. | ................... | 702/186 |
| 6,587,966 B1 * | 7/2003 | Chaiken et al. | ................. | 714/34 |
| 6,675,295 B1 * | 1/2004 | Marcelais et al. | ................ | 713/2 |
| 7,032,213 B1 * | 4/2006 | Lupu et al. | .................... | 717/129 |
| 2003/0065854 A1 * | 4/2003 | Bohm et al. | .................. | 710/260 |
| 2005/0120242 A1 * | 6/2005 | Mayer et al. | .................. | 713/201 |
| 2006/0129600 A1 * | 6/2006 | Ode | .......................... | 707/104.1 |
| 2007/0240146 A1 * | 10/2007 | Chinnadurai et al. | ........ | 717/168 |
| 2009/0287914 A1 * | 11/2009 | Shah et al. | ........................ | 713/1 |
| 2010/0313223 A1 * | 12/2010 | Straub | ............................. | 725/60 |
| 2011/0145815 A1 * | 6/2011 | Zou et al. | ......................... | 718/1 |

FOREIGN PATENT DOCUMENTS

| | | |
|---|---|---|
| JP | 2000047844 A | 2/2000 |
| JP | 2006259886 A | 9/2006 |
| JP | 2008211747 A | 9/2008 |

* cited by examiner

*Primary Examiner* — Mark Connolly (74) *Attorney, Agent, or Firm* — Fitzpatrick, Cella, Harper & Scinto (57) ABSTRACT

A boot control method of a program in an information processing apparatus to which a device can be connected, the method including a search step of searching for a running program that is running on the information processing apparatus when the device is connected, a determination step of determining whether the running program found in the search step includes a program unfit for concurrent running that is unsuited for concurrent running with preset device-corresponding software that is booted in response to connection of the device, and a boot step of booting the device-corresponding software if the running program does not include the program unfit for concurrent running and performing control so as not to boot the device-corresponding software if the running program includes the software unfit for concurrent running.

7 Claims, 8 Drawing Sheets

| TYPE OF INK | DEVICE-CORRESPONDING SOFTWARE | STATE-CORRESPONDING SOFTWARE | |
|---|---|---|---|
| CMYKG INKS | DECORATION SOFTWARE | DECORATION SOFTWARE | ~801 |
| CMYK INKS | MARGINLESS PRINTING SOFTWARE | DECORATION SOFTWARE, MARGINLESS PRINTING SOFTWARE | ~802 |

SYSTEM AND METHOD FOR BOOTING DEVICE CORRESPONDING SOFTWARE IF IT DOES NOT CONFLICT WITH A PROGRAM CURRENTLY RUNNING WHEN A DEVICE IS CONNECTED TO AN INFORMATION HANDLING SYSTEM

BACKGROUND OF THE INVENTION

1. Field of the Invention

The present invention relates to a technique for controlling the booting of a program when a device is connected.

2. Description of the Related Art

Some conventional device control apparatuses control the booting of software that is booted when a device is connected (see Japanese Patent Laid-Open No. 2006-259886, for example). Such control is performed in the following manner: the number of pieces of software corresponding to devices that can be booted is preset, and when a device that exceeds this preset number is connected, the booting of software corresponding to that device is put into a standby state.

Moreover, conventional task booting methods include a task booting method that is performed by communicating with a server apparatus that manages a task flow for executing a plurality of function processes in cooperation with each other (see Japanese Patent Laid-Open No. 2008-211747, for example). In this method, it is determined whether a task flow based on a requested function is registered with the server apparatus, and a plurality of function processes corresponding to the requested function is executed by referring to the registered task flow.

Moreover, some conventional printing systems determine the type of paper cassette set in a printing apparatus and automatically boot different pieces of software depending on the paper cassette in the printing apparatus (see Japanese Patent Laid-Open No. 2000-047844, for example). In such systems, combinations of the types of paper cassettes (e.g., a business card size) and software for printing (e.g., software for printing business cards) are pre-registered, and the software to be booted is changed based on that information.

With the conventional device control apparatus, whenever a device is connected to a device control apparatus, corresponding software is booted. At this time, there are cases where, for example, a user connects a device during installation of a driver, and software corresponding to the device is booted even though the driver is currently being installed. Thus, the driver installation is concealed by the booted software or a resource conflict occurs, and the driver installation operation may be disturbed or delayed. Therefore, user operations are disturbed while the software is being booted, and furthermore, time and effort are required to terminate the software. Also, there is a problem in that since the installation of the driver is not finished, the booted software is booted in a state in which the software cannot use that driver.

Moreover, with the conventional task booting method, a task flow requested through the input of data is always executed. Thus, the task is executed even if programs that are currently running include software that will cause disruptions if that task is executed. Therefore, user operations are disturbed, and furthermore, time and effort are required to terminate that software.

Moreover, with the conventional printing system, whenever a printing apparatus is connected to a device control apparatus, corresponding software is booted in the device control apparatus based on the information about a combination of a cassette and printing software. However, there are cases where the user desires to perform printing using a different piece of software instead of that printing software. In such a case, although the user runs software that she/he desires to use in the device control apparatus beforehand, the pre-registered software is automatically booted when a printing apparatus is connected to the device control apparatus. Thus, user operations are disturbed while the pre-registered software is being booted, and furthermore, time and effort are required to terminate that software.

SUMMARY OF THE INVENTION

The present invention has been made in consideration of the above situation, and it is a feature of the present invention to prevent software that will cause disruptions from being booted when the user connects a device to a device control apparatus.

Moreover, it is a feature of the present invention to allow software desired by the user to be booted when the user connects a device to a device control apparatus.

According to the present invention, provided is a boot control method of a program in an information processing apparatus to which a device can be connected, the method comprising: a search step of searching for a running program that is running on the information processing apparatus when the device is connected; a determination step of determining whether the running program found in the search step includes a program unfit for concurrent running that is not suited for concurrent running with preset device-corresponding software that is booted in response to connection of the device; and a boot step of booting the device-corresponding software if the running program does not include the program unfit for concurrent running, and performing control so as not to boot the device-corresponding software if the running program includes the program unfit for concurrent running.

According to the present invention, provided is a boot control method of a program in an information processing apparatus to which a device can be connected, the method comprising: a boot step of booting predetermined device-corresponding software corresponding to the device in response to connection of the device; a search step of searching for a running program that is running when the device is connected; a determination step of determining whether the running program found in the search step includes a program unfit for concurrent running that is not suited for concurrent running with the device-corresponding software; and a termination step of terminating the device-corresponding software if the running program includes the program unfit for concurrent running.

According to the present invention, provided is a boot control method of a program in an information processing apparatus to which a printing apparatus can be connected, the method comprising: a search step of searching for a running program that is running when the printing apparatus is connected; an acquisition step of acquiring a state of the printing apparatus when the printing apparatus is connected; a determination step of determining whether the running program includes state-corresponding software corresponding to the acquired state of the printing apparatus; and a boot step of booting preset device-corresponding software in response to the connection of the printing apparatus if the running program does not include the state-corresponding software, and performing control so as not to boot the device-corresponding software if the running program includes the state-corresponding software.

According to the present invention, provided is a boot control method of a program in an information processing apparatus to which a printing apparatus can be connected, the method comprising: a search step of searching for a running program that is running when the printing apparatus is connected; an acquisition step of acquiring a state of the printing apparatus when the printing apparatus is connected; a determination step of determining whether the running program includes state-corresponding software corresponding to the acquired state of the printing apparatus; and a boot step of booting preset device-corresponding software in response to the connection of the printing apparatus if the running program does not include the state-corresponding software, determining whether the state-corresponding software has been used for printing if the running program includes the state-corresponding software, performing control so as not to boot the device-corresponding software if the state-corresponding software has not been used, and boot the device-corresponding software when the device-corresponding software is designated by a user if the state-corresponding software has been used.

According to the present invention, provided is a boot control apparatus comprising: a storage unit that stores the type of device-corresponding software that is booted in response to connection of a device and the type of a program unfit for concurrent running that is not suited for concurrent running with the device-corresponding software; a search unit that searches for a running program that is running when the device is connected; and a boot unit that determines whether the running program includes the program unfit for concurrent running, boots the device-corresponding software if the running program does not include the program unfit for concurrent running, and performs control so as not to boot the device-corresponding software if the running program includes the program unfit for concurrent running.

According to the present invention, provided is a boot control apparatus comprising: a boot unit that boots device-corresponding software corresponding to a device in response to connection of the device; a storage unit that stores the type of device-corresponding software and the type of a program unfit for concurrent running that is not suited for concurrent running with the device-corresponding software; and a search unit that searches for a running program that is running when the device is connected, wherein the boot unit determines whether the running program includes the program unfit for concurrent running, and terminates the device-corresponding software if the running program includes the program unfit for concurrent running.

According to the present invention, provided is a boot control apparatus comprising: a storage unit that stores the type of state-corresponding software corresponding to a state of a printing apparatus and the type of device-corresponding software that is booted in response to connection of the printing apparatus; a search unit that searches for a running program that is running when the printing apparatus is connected; an acquisition unit that acquires the state of the printing apparatus when the printing apparatus is connected; and a boot unit that determines whether the running program includes the state-corresponding software corresponding to the acquired state of the printing apparatus, boots the device-corresponding software if the running program does not include the state-corresponding software, and performs control so as not to boot the device-corresponding software if the running program includes the state-corresponding software.

According to the present invention, provided is a boot control apparatus comprising: a storage unit that stores the type of state-corresponding software corresponding to a state of a printing apparatus and the type of device-corresponding software that is booted in response to connection of the printing apparatus; a search unit that searches for a running program that is running when the printing apparatus is connected; an acquisition unit that acquires the state of the printing apparatus when the printing apparatus is connected; and a boot unit that determines whether the running program includes the state-corresponding software corresponding to the acquired state of the printing apparatus, boots preset device-corresponding software in response to the connection of the printing apparatus if the running program does not include the state-corresponding software, determines whether the state-corresponding software has been used for printing if the running program includes the state-corresponding software, performs control so as not to boot the device-corresponding software if the state-corresponding software has not been used, and performs control so as to boot the device-corresponding software when the device-corresponding software is designated by a user if the state-corresponding software has been used.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

First Embodiment

Figure 1:
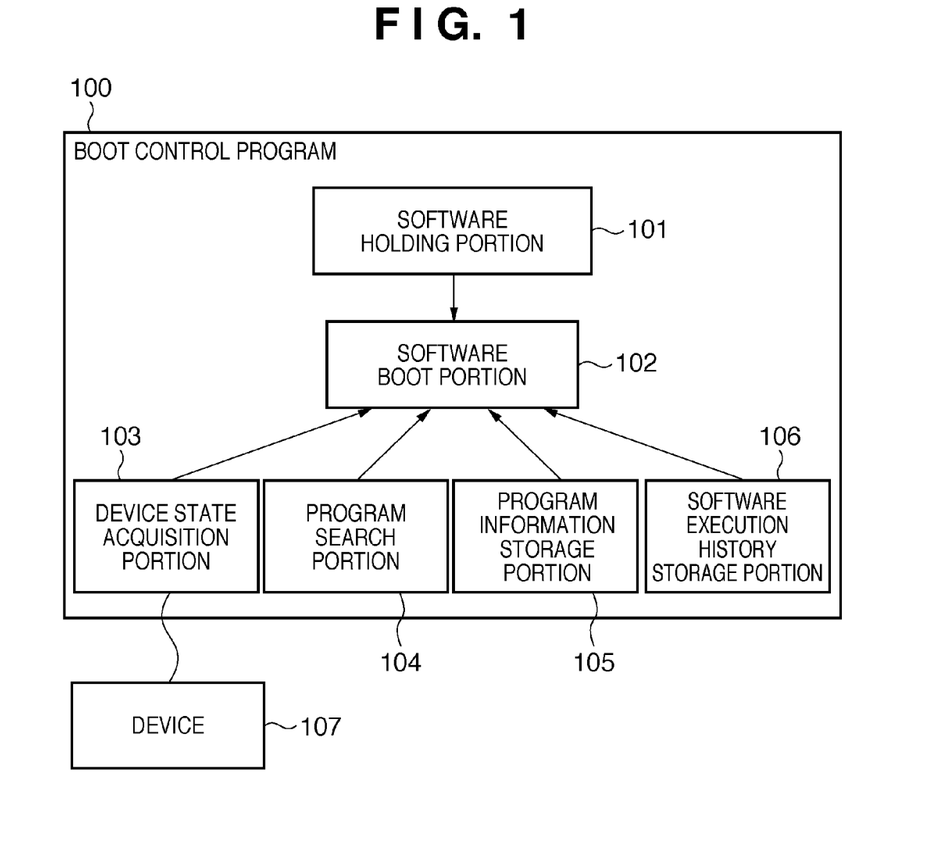
FIG. 1 is a block diagram showing the configuration of a boot control program according to a first embodiment of the present invention.

FIG. 1 is a block diagram showing the configuration of a boot control program 100 according to a first embodiment of the present invention. The boot control program 100 expresses a program that detects that a device has been connected and boots software corresponding to the detected device (hereinafter referred to as "device-corresponding software"). It should be noted that the device-corresponding software can be preset for each device to be connected. An example of the boot control program 100 is a program called a resident program that runs on an information processing apparatus (e.g., a personal computer (PC)) at all times and boots software upon detecting that a device has been connected to the PC.

107 indicates a device, which includes devices such as a camera, a scanner, and a printing apparatus. 101 indicates a software holding portion that holds a plurality of pieces of device-corresponding software, and 102 indicates a software boot portion that boots the software held by the software holding portion 101. It should be noted that the device-corresponding software is usually saved in a storage medium such as a hard disk. Thus, in such a case, the software holding portion 101 holds information that is necessary for the software boot portion 102 to boot the device-corresponding software, such as the name of the path for the device-corresponding software.

103 indicates a device state acquisition portion that acquires the state of the device 107. In the case where the device 107 is a printing apparatus, examples of the state of the device 107 include the type of the size of paper set in the printing apparatus, the type of the material of paper, the type of the color of ink, the type of the material of ink, and the like. Moreover, the device state acquisition portion 103 detects that the device 107 has been connected to the PC and notifies the software boot portion 102 of it. Thus, when the device 107 is connected, the device-corresponding software can be automatically booted. 104 indicates a program search portion that searches for a program that is currently running (hereinafter referred to as a "running program"). Examples of the searching method include a method that uses a process name and other methods.

105 indicates a program information storage portion that records program information related to the device-corresponding software. The program information will be described later with reference to FIG. 2. 106 indicates a software execution history storage portion that stores any function executed after the device-corresponding software is booted. The software execution history storage portion 106 detects that the device-corresponding software has been booted, and also detects a function executed from the device-corresponding software and stores that function. The software execution history storage portion 106 detects that the device-corresponding software has been terminated after booting, and hence also stores information of the termination.

Figure 2:
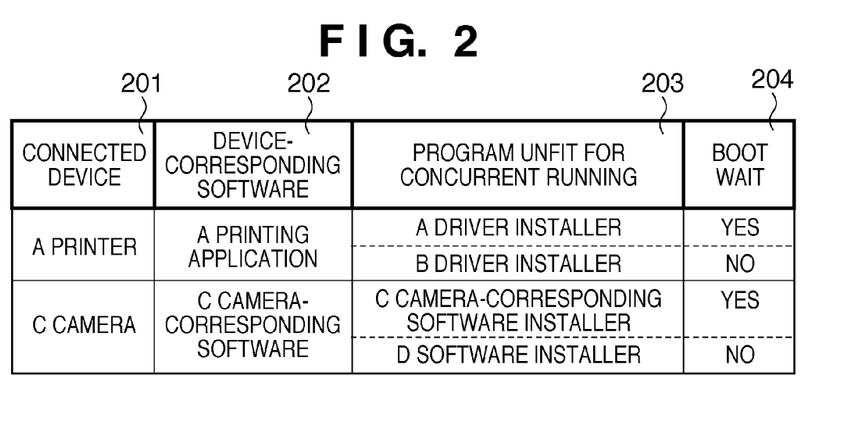
FIG. 2 is a diagram illustrating an example of program information according to the first embodiment of the present invention.

FIG. 2 shows an example of the program information stored in the program information storage portion 105. 201 indicates information regarding a connected device, and a printer and a camera are listed here as examples of the connected devices. 202 indicates information regarding the device-corresponding software to be booted for each device. 203 indicates information regarding another program that will be disrupted if the device-corresponding software is concurrently executed while that program is running (hereinafter referred to as a "program unfit for concurrent running"). 204 indicates information regarding an example of response information (described later), and for each program unfit for concurrent running, the response information as to whether to wait for termination of that program when booting the device-corresponding software is held.

Figure 3:
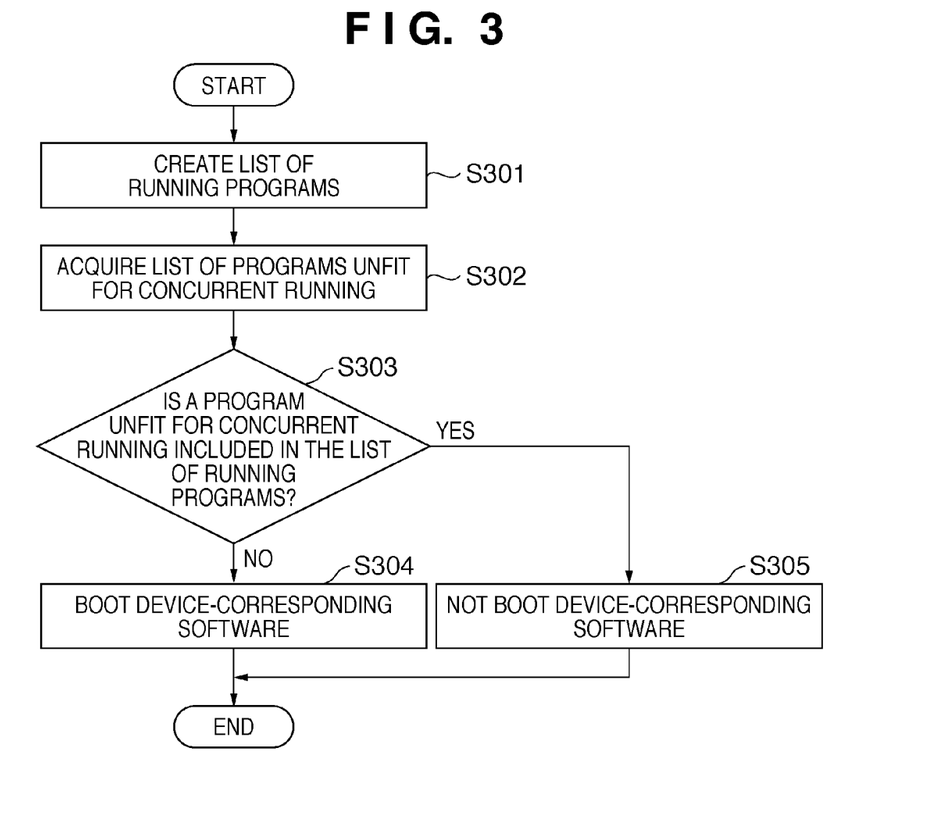
FIG. 3 is a flowchart showing a boot control process according to the first embodiment of the present invention.

FIG. 3 is a flowchart illustrating an example of a boot process according to the first embodiment that is performed by the boot control program 100 when the device 107 is connected.

When the device 107 is connected, the program search portion 104 searches for a running program and creates a list of running programs (S301). Next, the program search portion 104 refers to the program information stored in the program information storage portion 105 and creates a list of programs unfit for concurrent running (S302). Then, the software boot portion 102 checks whether a program unfit for concurrent running with respect to the device-corresponding software of the device 107 is included in the list of running programs (S303), and if such a program is included therein, the process is terminated without booting the device-corresponding software (S305). On the other hand, if a program unfit for concurrent running is not included in the list of running programs (NO in S303), the device-corresponding software is booted (S304), and the process is terminated.

As described above, according to the first embodiment, it is possible to prevent software from being booted that will cause disruptions when a device is connected.

Variation 1

According to the process shown in the flowchart in FIG. 3 described above in the first embodiment, if a program unfit for concurrent running is running, control is performed so as to prevent the device-corresponding software from being booted. In contrast, control can also be performed in the following manner by checking the boot wait information 204 of the program information shown in FIG. 2. That is to say, if a program unfit for concurrent running is running, it is determined whether to not boot the device-corresponding software, or to boot the device-corresponding software after waiting for the program unfit for concurrent running to be terminated; control is then performed according to the determination. Hereinafter, this will be described with reference to a flowchart in FIG. 4.

Figure 4:
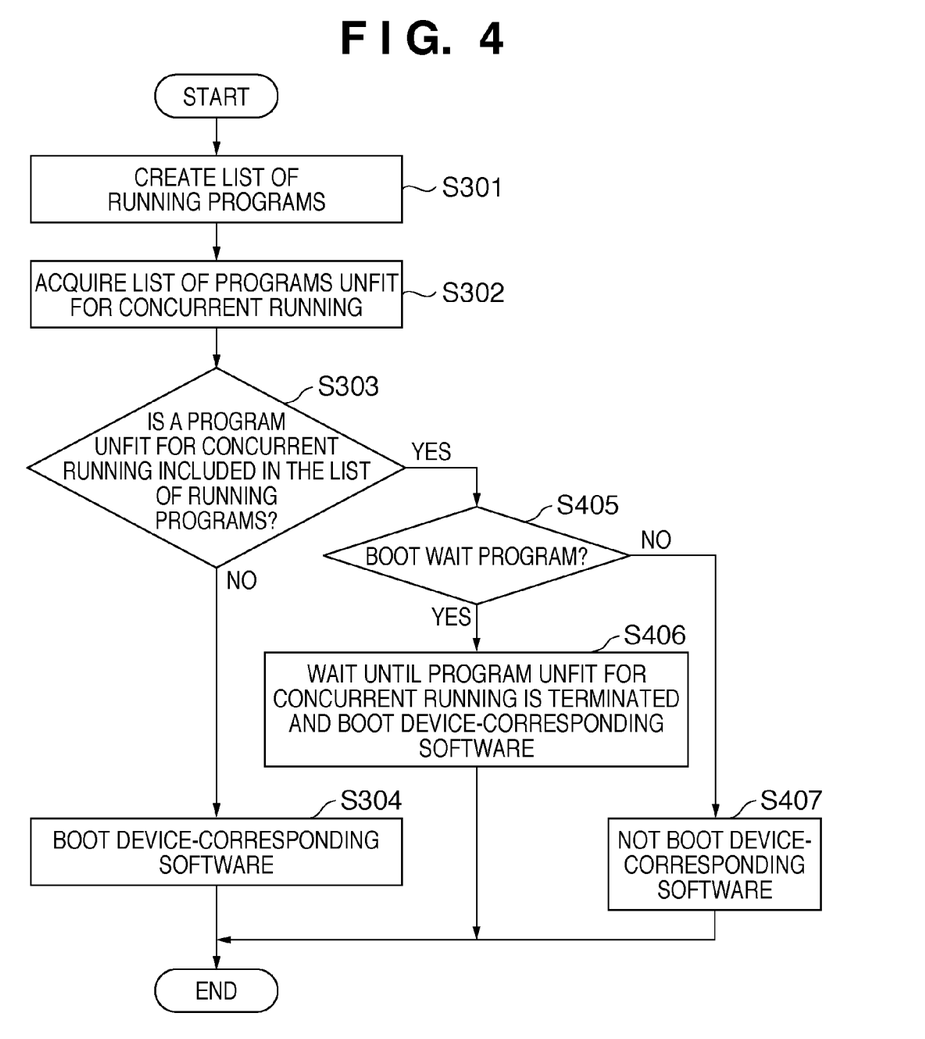
FIG. 4 is a flowchart showing a boot control process according to Variation 1 of the present invention.

FIG. 4 is a flowchart illustrating an example of a boot process according to Variation 1 that is performed by the boot control program 100 when the device 107 is connected. It should be noted that the same process steps as those in FIG. 3 are denoted by the same reference numerals, and descriptions thereof will be omitted.

In Variation 1, if a program unfit for concurrent running is included in the list of running programs (YES in S303), the boot wait information 204 of the included program unfit for concurrent running is checked. Then, it is determined whether to boot the device-corresponding software after waiting until the program unfit for concurrent running is terminated (S405). If it is determined that the device-corresponding software is to be booted (YES in S405), i.e., if the boot wait information 204 of the relevant program unfit for concurrent running indicates that a boot wait is to be performed, the device-corresponding software is booted after waiting for termination of the program unfit for concurrent running that is running (S406). On the other hand, if it is determined that the program unfit for concurrent running is not a program whose termination is to be waited for in order to boot the software (NO in S405), i.e., if the boot wait information 204 of the relevant program unfit for concurrent running indicates that a boot wait is not to be performed, the process is terminated without booting the device-corresponding software (S407).

Second Embodiment

According to the process shown in the flowchart in FIG. 3 described above in the first embodiment, if a program unfit for concurrent running is running, control is performed so as to prevent the device-corresponding software from being booted. In contrast, in a second embodiment, a case where the boot control program 100 is a program that runs at all times (a resident program) and constantly monitors running programs and booted software to execute processing will be described with reference to a flowchart in FIG. 5. It should be noted that the boot control program and the program information are the same as those described in the first embodiment with reference to FIGS. 1 and 2, and descriptions thereof are thus omitted here.

Figure 5:
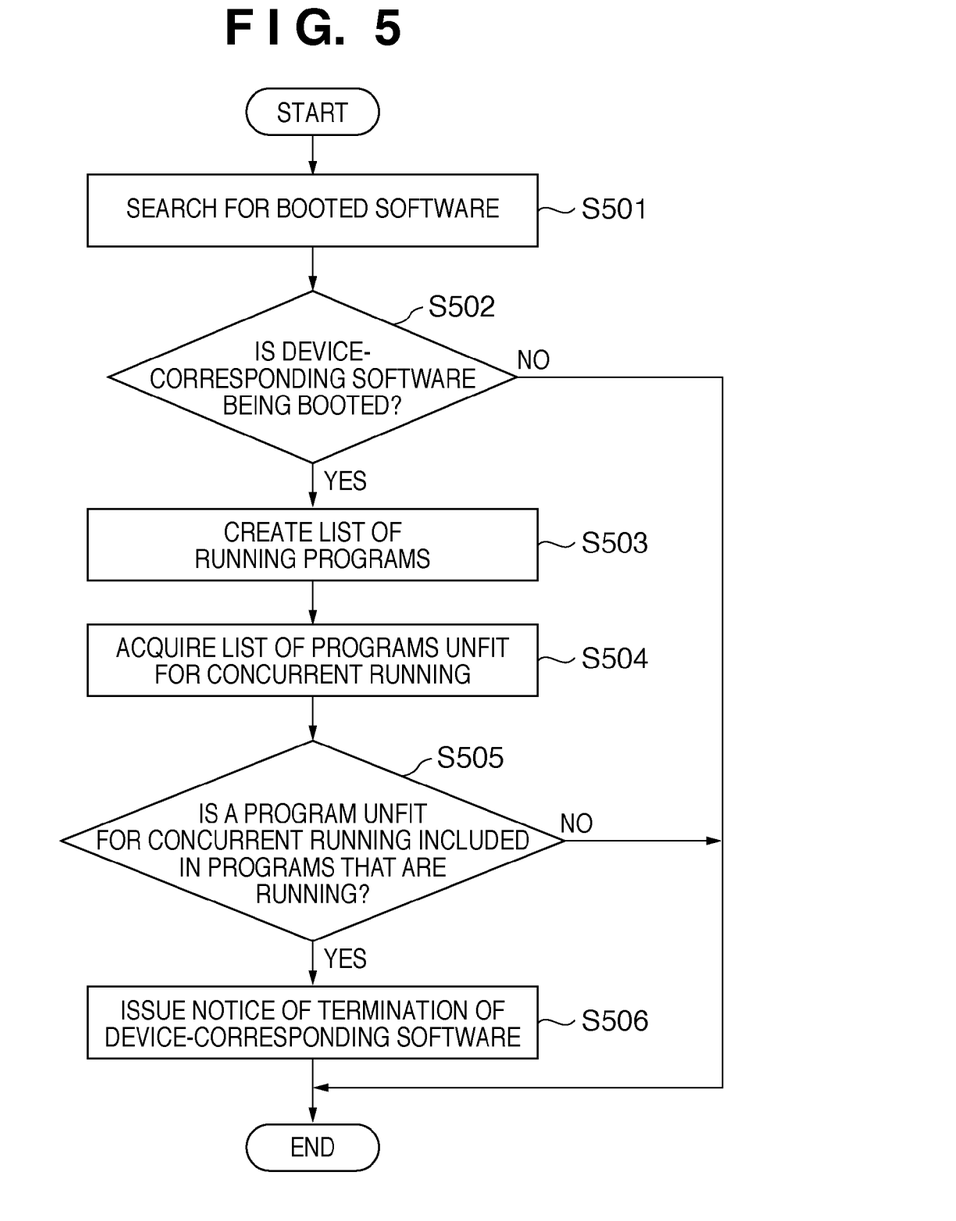
FIG. 5 is a flowchart showing a boot control process according to a second embodiment of the present invention.

First, a search is made for booted software (S501), and a check is performed to see whether the device-corresponding software is being booted (S502). If the software is not being booted, the process is terminated. If the device-corresponding software is being booted (YES in S502), the program search portion 104 searches for a running program and creates a list of running programs (S503). Next, the program search portion 104 refers to the program information stored in the program information storage portion 105 and creates a list of programs unfit for concurrent running (S504). Then, the software boot portion 102 checks whether a program unfit for concurrent running is included in the list of running programs (S505), and if such a program is not included in the list of running programs, the process is terminated. On the other hand, if a program unfit for concurrent running is included in the list of running programs (YES in step S505), a notice of termination of the device-corresponding software is issued (S506), and the process is terminated.

As described above, according to the second embodiment, it is possible to terminate the booting of software that will cause disruptions when a device is connected.

Variation 2

In the case where the boot control program 100 detects that a program unfit for concurrent running is running during booting of the device-corresponding software, the boot control program 100 can perform control so as to issue a notice of termination to the device-corresponding software that has already been booted. By performing control in this manner, a user can be prompted to terminate software that will cause disruptions when booted concurrently.

In the process described above with reference to FIG. 5, when the boot control program 100 detects that a program unfit for concurrent running is running during booting of the device-corresponding software, the boot control program 100 issues a notice of termination to the device-corresponding software that is being booted. In Variation 2, furthermore, it is possible to determine that the previously running program unfit for concurrent running is terminated after the termination of the device-corresponding software to which the notice of termination was issued and reboot the device-corresponding software after the termination of the previously running program is determined.

Figure 6:
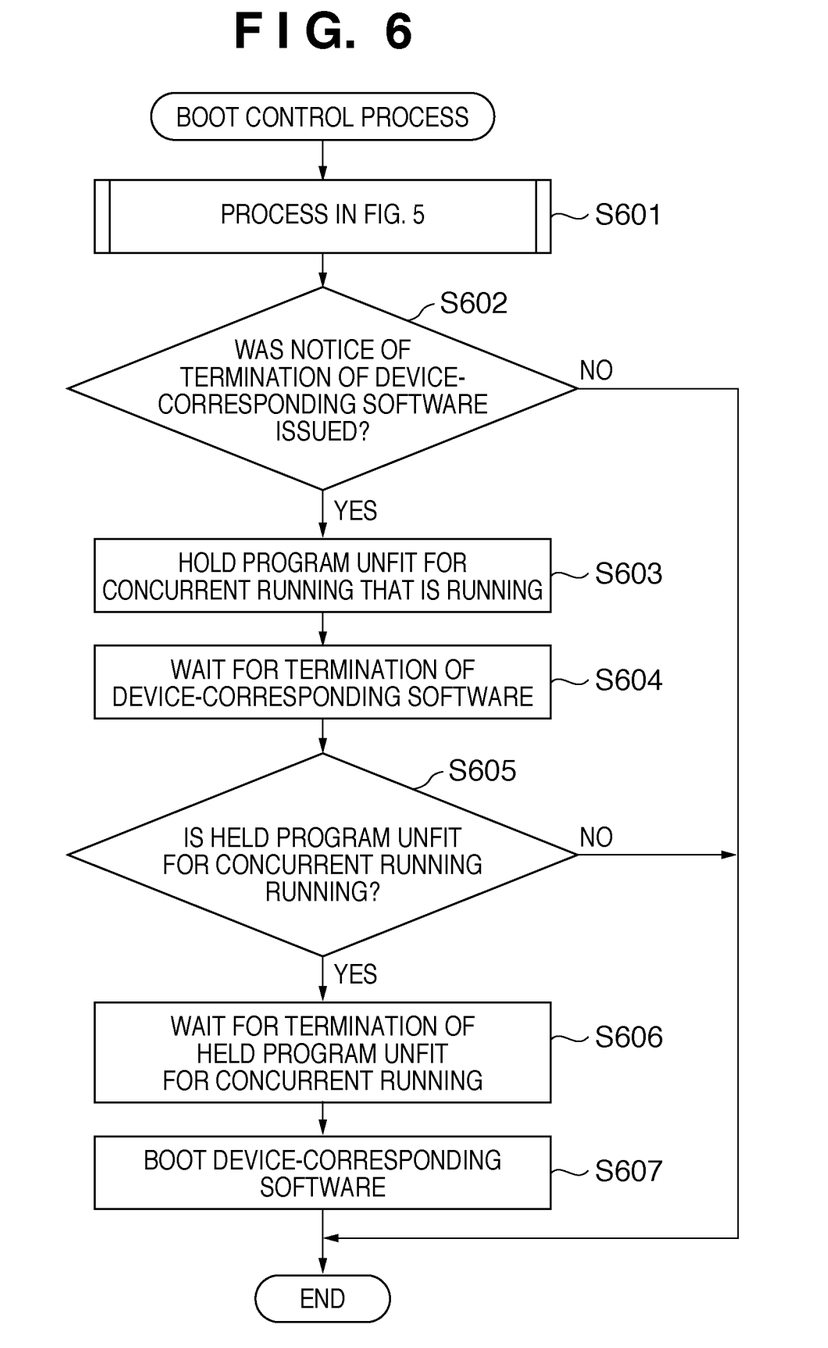
FIG. 6 is a flowchart showing a boot control process according to Variation 2 of the present invention.

FIG. 6 is a flowchart illustrating a boot control process for explaining the operation of the boot control program when the notice of termination has been issued during booting of the device-corresponding software. In Variation 2, it is assumed that the boot control program is a program that runs at all times (a resident program) and constantly monitors running programs and booted software to execute processing.

First, in S601, the process described in FIG. 5 is executed. Next, it is checked whether a notice of termination of the device-corresponding software was issued (S602), and if the notice was not issued, the process is terminated. On the other hand, if the notice of termination was issued (YES in S602), the currently running program unfit for concurrent running that was detected in S505 of FIG. 5 is held (S603).

Next, the boot control program waits until the device-corresponding software is terminated (S604), and when the device-corresponding software is terminated, it is determined whether the program unfit for concurrent running held in S603 is running (S605). If the held program unfit for concurrent running is not running (NO in S605), the process is terminated. On the other hand, if the held program unfit for concurrent running is running (YES in S605), the boot control program waits until the held program unfit for concurrent running is terminated (S606).

When the program unfit for concurrent running is terminated, the device-corresponding software that was terminated by the notice of termination in S604 is booted (S607). By performing control in this manner, the terminated device-corresponding software can be automatically rebooted without the user having to execute the boot process of the device-corresponding software once again.

It should be noted that although the case where the device-corresponding software is rebooted after the termination of the program unfit for concurrent running is described in the example above, it is also possible to use the boot wait information 204 in FIG. 2 to perform control so as to reboot the device-corresponding software only in the case where a boot wait is to be performed.

It should be noted that an example of the boot control program that is resident in order to boot software corresponding to a device when the device is connected to the computer is described in the example above, and the present invention may be applied to, for example, a printing apparatus or a camera serving as the device. That is to say, in the case where a printing apparatus is connected to the computer and software for printing is booted, an installation program for installing a printer driver serves as the program unfit for concurrent running. Then, if the installation program for the printer driver is running, the boot control program operates so as not to boot the software for printing even when the printing apparatus is connected to the computer.

Moreover, in the case where a camera is connected to the computer and software is booted in order to, for example, capture an image from the camera, a program that updates a program for transferring the image serves as the program unfit for concurrent running. In this case, if the program that updates the program for transferring the image is running, the boot control program operates so as not to boot the software for capturing the image from the camera even when the camera is connected to the computer.

Third Embodiment

Next, a third embodiment of the present invention will be described. In the third embodiment of the present invention, a case where different pieces of software are automatically booted depending on the type of ink set in a printing apparatus will be described.

Figure 7:
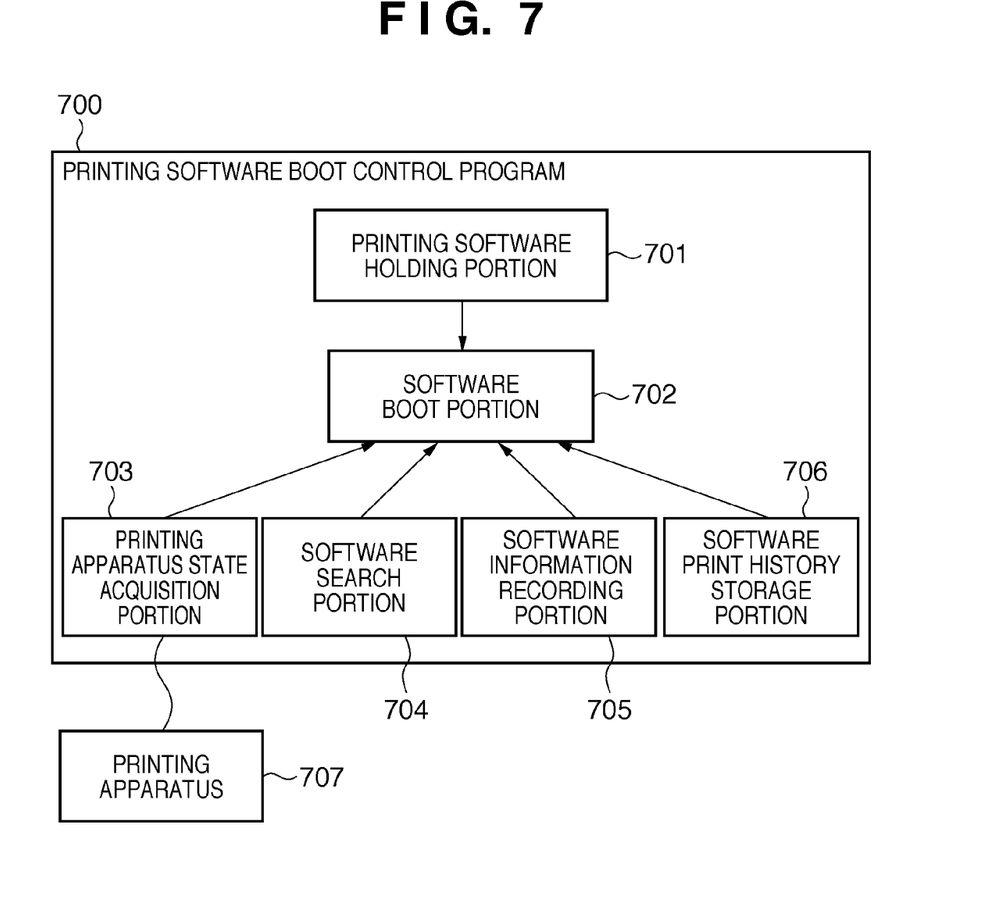
FIG. 7 is a block diagram showing the configuration of a printing software boot control program according to a third embodiment of the present invention.

FIG. 7 is a block diagram showing the configuration of a printing software boot control program 700 according to the third embodiment. In this diagram, 707 indicates a printing apparatus such as an inkjet printer, a dye sublimation printer, and a laser printer. However, the type of the printing apparatus does not limit the present invention. 701 indicates a printing software holding portion that holds a plurality of pieces of application software for performing printing on the printing apparatus 707, and 702 indicates a software boot portion that boots one of the pieces of software held by the printing software holding portion 701. It should be noted that software is usually saved in a storage medium such as a hard disk; therefore, in such a case, the printing software holding portion 701 holds information that is required by the software boot portion 702 so that the software boot portion 702 can boot the software, such as the name of the path for the software to be booted.

703 indicates a printing apparatus state acquisition portion that acquires the state of the printing apparatus 707. Examples of the state of the printing apparatus 707 include the type of the size of paper set in the printing apparatus 707, the type of the material of paper, the type of the color of ink, the type of the material of ink, and the like. Moreover, the printing apparatus state acquisition portion 703 detects that the printing apparatus 707 has been connected to a PC and notifies the software boot portion 702 of it. Thus, when the printing apparatus 707 is connected, corresponding software held by the printing software holding portion 701 can be automatically booted. 704 indicates a software search portion that searches for software that is currently running (hereinafter referred to as "running software"). Examples of the searching method include a method that uses a process name or the like and other methods.

705 indicates a software information recording portion that records information about the correspondence between a state of the printing apparatus 707 and software that supports that state. 706 is a software print history storage portion that stores a history of prints executed using the software that is running.

Figure 8:
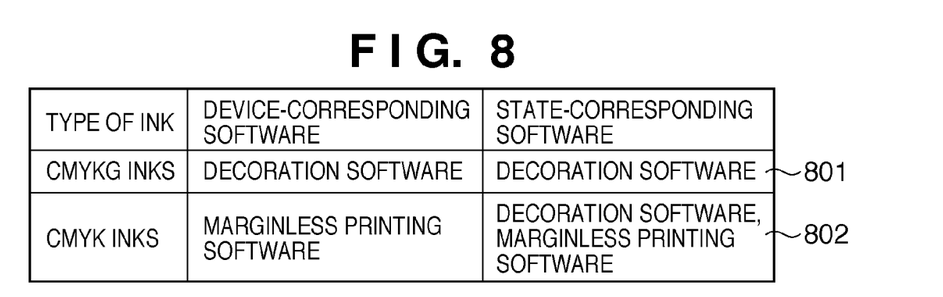
FIG. 8 is a diagram illustrating an example of software information according to the third embodiment of the present invention.

FIG. 8 shows an example of the software information recorded in the software information recording portion 705. In the description here, the type of the color of ink (hereinafter referred to as the "type of ink") is used as an example of the state of the printing apparatus 707. For each type of ink, the software information recording portion 705 has information about software that is booted for that type of ink (hereinafter referred to as "device-corresponding software") and software that corresponds to that type of ink (hereinafter referred to as "state-corresponding software"). "Device-corresponding software" refers to software that is booted when the printing apparatus 707 is connected to the computer, and can be preset for each type of ink in the third embodiment. "State-corresponding software" refers to software that can perform printing using the ink set in the printing apparatus 707, and a plurality of types of state-corresponding software can be preset for each type of ink in the third embodiment.

As indicated by reference numeral 801 in FIG. 8, in the case of CMYKG inks, the state-corresponding software is decoration software and the device-corresponding software is the decoration software. Here, the CMYKG inks are inks that allow for printing in G (gold) in addition to the four colors C (cyan), M (magenta), Y (yellow), and K (black). Moreover, the decoration software is software that allows for printing of a photograph with a frame added to the periphery thereof or with a decoration, a mark, a character, or the like added thereto.

Digital photograph data is usually expressed by the RGB system or the like and therefore does not have information regarding gold. For this reason, in the case where only a photograph is printed, CMYKG inks are not necessary. In particular, in the case of a so-called integral-type ink tank, which is a single tank containing the CMYKG inks, if the CMYKG inks are used to perform only printing in CMYK, the ink tank will be discarded when the CMYK inks are exhausted with the G ink still remaining, which is uneconomical. Usually, the CMYKG inks are used when a photograph that is decorated with gold is printed. That is to say, it can be thought that when the CMYKG inks are set in the printing apparatus, the user desires to decorate the photograph with gold. Thus, both the state-corresponding software and the device-corresponding software for the CMYKG inks are the decoration software.

Moreover, as indicated by reference numeral 802, for CMYK inks, the state-corresponding software is the decoration software and marginless printing software and the device-corresponding software is the marginless printing software. Here, the CMYK inks are inks that allow for ordinary printing in CMYK. The marginless printing software is software that performs marginless printing of photograph data on, for example, A4-size paper as-is without decorating the photograph data. The CMYK inks are used for both printing with decoration and printing without decoration. Accordingly, the CMYK inks are associated with the decoration software and the marginless printing software as the state-corresponding software. However, generally, marginless printing without decoration is more often performed. Thus, with respect to the device-corresponding software, the CMYK inks are associated with the marginless printing software.

Figure 9:
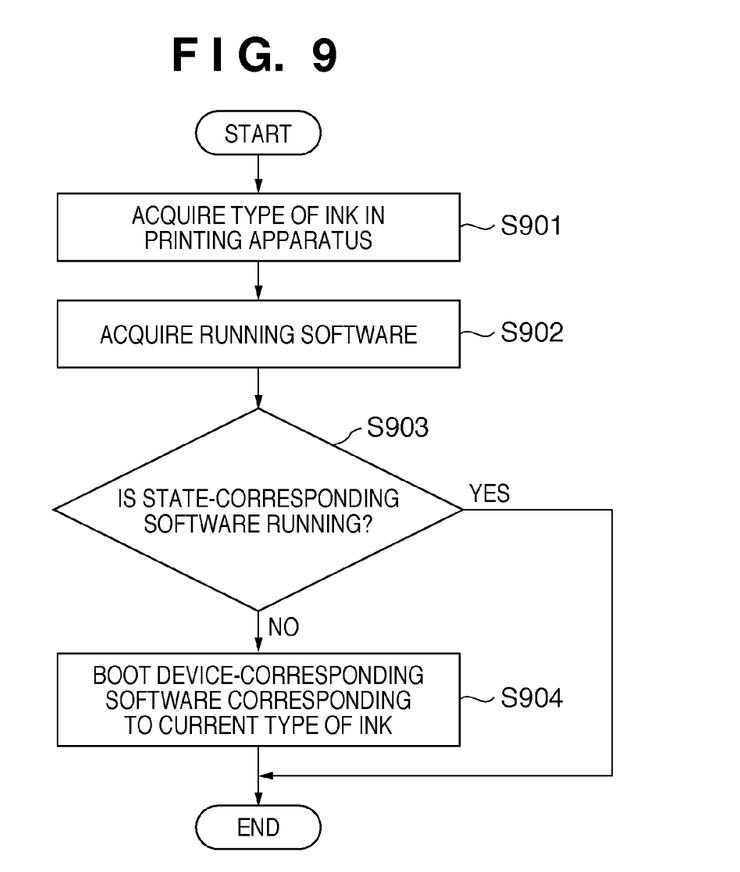
FIG. 9 is a flowchart showing a printing software boot control process according to the third embodiment of the present invention.

Next, the operation of the printing software boot control program 700 that is performed when the printing apparatus 707 is connected will be described with reference to a flowchart in FIG. 9.

When the printing apparatus 707 is connected, the printing apparatus state acquisition portion 703 acquires the type of ink set in the printing apparatus 707 (S901) and notifies the software boot portion 702 of the acquired type of ink. Next, the software search portion 704 searches for running software and creates a list thereof (S902). Thereafter, the software boot portion 702 refers to the software information recording portion 705 to determine the state-corresponding software for the type of ink acquired in S901 and checks whether the determined state-corresponding software is included in the running software (S903).

If the determined state-corresponding software is not included therein, the state-corresponding software for the current ink is not booted. In that case, the software boot portion 702 refers to the software information recording portion 705 and boots the device-corresponding software for the current ink type (S904). A specific example of processing in this case will be described below.

For example, assume that the CMYK inks are set in the printing apparatus 707. If no software is running, software for the current inks is not running at S903 in FIG. 9. Therefore, when the printing apparatus 707 is connected, the content of the software information recording portion 705 in FIG. 8 is referred to and the marginless printing software, which is the device-corresponding software for the CMYK inks, is booted (S904).

Here, some specific examples of the above-described control will be described.

For example, assume that after the user performs printing with the CMYK inks using the marginless printing software, the user changes the ink to the CMYKG inks in order to perform decoration printing with the gold ink and then connects the printing apparatus 707 once again. In this case, since the running software that is currently running is not appropriate for the CMYKG inks (NO in S903), the decoration software, which is the device-corresponding software for the CMYKG inks, is automatically booted (S904). Thus, the user does not have to boot the decoration software by him/herself. In this manner, the user simply has to connect the printing apparatus 707 to automatically boot appropriate software, and thus it is possible to save the time and effort required to boot the appropriate software.

On the other hand, if the software corresponding to the current type of ink is running (YES in S903), the running software can be used to perform printing with the current ink, and therefore, another piece of software is not booted in the software information recording portion 705.

For example, assume that the CMYK inks are set in the printing apparatus 707. Assume also that the user desires to perform printing with the CMYK inks from the decoration software in order to perform decoration printing without using gold. In that case, all that is necessary is for the user to boot the decoration software beforehand and then connect the printing apparatus 707. It can be seen from FIG. 8 that the decoration software supports the CMYK inks. Accordingly, it is determined in S903 that the state-corresponding software is running, and the device-corresponding software (in this case, the marginless printing software) is not booted.

In this manner, the user can prevent the device-corresponding software from being automatically booted, by running software that she/he desires to use beforehand, and can immediately start a printing job using the desired software without disturbing operations.

Variation 3

In Variation 3, a method for more reliably preventing the automatic booting of software not intended by the user to be booted will be described with reference to a flowchart in FIG. 10.

Figure 10:
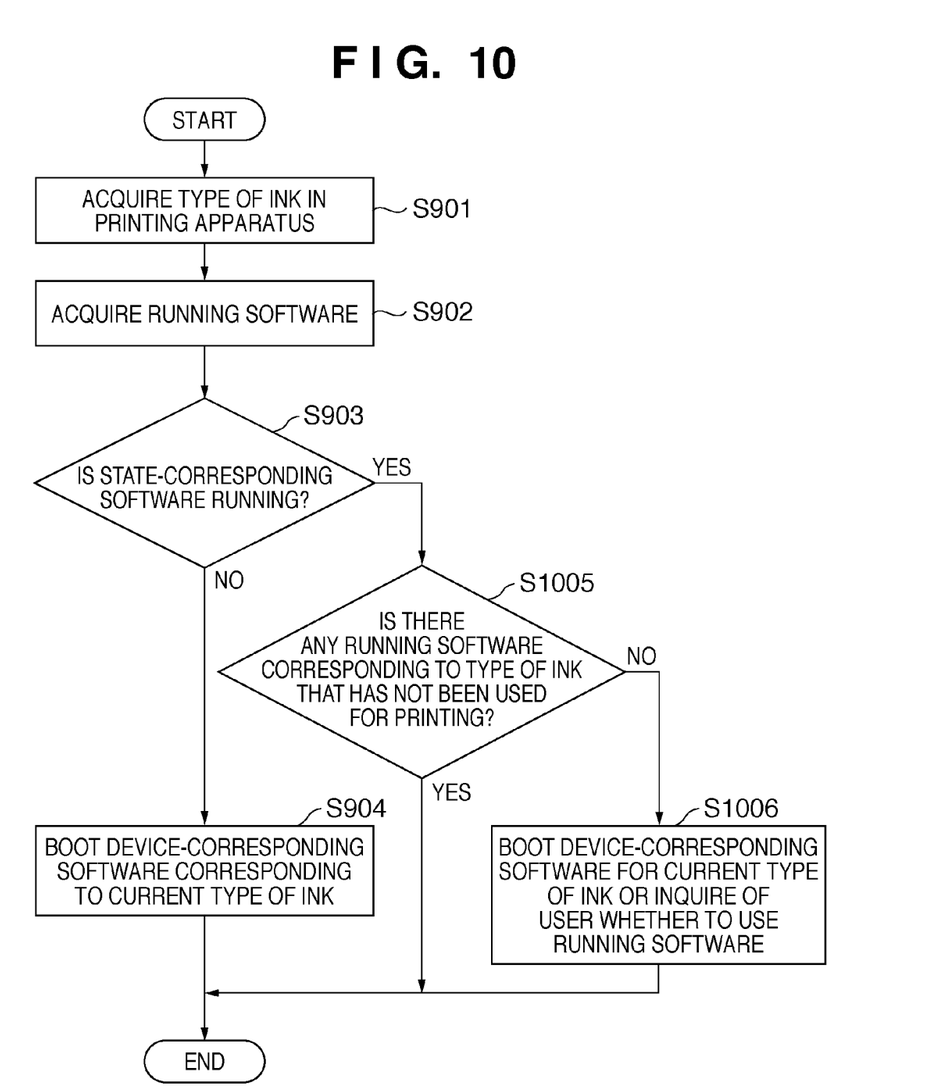
FIG. 10 is a flowchart showing a printing software boot control process according to Variation 3 of the present invention.

FIG. 10 is a flowchart illustrating the operation of the printing software boot control program 700 that is performed when the printing apparatus 707 is connected in Variation 3. It should be noted that the same process steps as those in FIG. 9 are denoted by the same reference numerals, and descriptions thereof will be omitted.

Variation 3 features processing in the case where it is determined in S903 that the software corresponding to the current type of ink is running. If it is determined that running software corresponding to the current type of ink is present, the software boot portion 702 refers to the software print history storage portion 706. Then, the software boot portion 702 checks whether there is software that has not been used for print processing by the user from the booting to the present among the running software that supports the current type of ink (S1005). If there is the running software that has not been used for print processing, software written in the software information recording portion 705 is not used. A specific example of processing in this case will be described below.

For example, assume that the CMYK inks are set in the printing apparatus 707, and the user desires to perform printing with the CMYK inks from the decoration software in order to perform decoration printing without using gold. In that case, if the user boots the decoration software beforehand and then connects the printing apparatus 707, it is determined in S903 that the state-corresponding software is running because the decoration software supports the CMYK inks. Meanwhile, if the user connects the printing apparatus 707 without performing printing after the booting of the decoration software, it is determined in S1005 that there is the running software that has not performed printing. In this case, the software boot portion 702 does not boot the device-corresponding software (here, the marginless printing software). That is to say, the user can suppress the automatic booting of the device-corresponding software by booting desired software that she/he desires to use beforehand and connecting the printing apparatus 707 without performing printing from that desired software. Thus, the user can immediately start a printing job using the desired software without disturbing operations. Moreover, since it is checked whether the running software has been used for printing, it can be more reliably determined that the user probably desires to perform printing from that software, and the automatic booting of software not intended by the user to be booted can be prevented more reliably.

On the other hand, in S1005, if there is no software that has not performed printing, that is, if any running software has been used for printing, the process proceeds to S1006. Then, the software boot portion 702 inquires of the user whether to use the running software or to boot the device-corresponding software listed in the software information recording portion 705, through a graphical user interface or the like. Then, in accordance with a user designation, the software boot portion 702 determines whether or not to boot the device-corresponding software. According to Variation 3, even though there is a plurality of pieces of running software, the user receives an inquiry only in the case where all the pieces of running software have been used for printing, which is less troublesome for the user.

It should be noted that in the examples described in the foregoing third embodiment and Variation 3, the case where processing is performed when the printing apparatus 707 is connected to the PC is described; however, the present invention may also be applied to operations in the case where the type of ink in the printing apparatus 707 is changed. That is to say, the printing apparatus state acquisition portion 703 is caused to detect that the type of ink has been changed instead of detecting that the printing apparatus 707 has been connected. Then, the software boot portion 702 is notified when the type of ink is changed, and thus, software corresponding to the changed type of ink can also be automatically booted out of the software held by the printing software holding portion 701.

Moreover, in the examples described in the foregoing third embodiment and Variation 3, the type of the color of ink is used as an example of the state of the printing apparatus 707; however, the present invention is not limited to the type of the color of ink. Other attributes that can define the state of the printing apparatus 707 and may change the state may also be used. For example and without limitation, the type of paper size, the type of the material of paper, the type of the material of ink (e.g., toner or ribbon), the state of a switch of the printing apparatus, the shape of the printing apparatus, the type of installed components, the type of a power source, and the like are conceivable.

It should be noted that the operations in the foregoing embodiments and variations can be performed by a CPU executing the boot control program 100 or the printing software boot control program 700 stored in a computer-readable storage medium such as a ROM.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-048274, filed on Mar. 2, 2009 which is hereby incorporated by reference herein in its entirety.

What is claimed is:

1. A boot control method of a program in an information processing apparatus to which a device can be connected, the method comprising:

an acquisition step of acquiring a state of the device when the device is connected;

a search step of searching for a running program that is running on the information processing apparatus when the device is connected;

a determination step of determining whether the running program found in said search step includes a program unfit for concurrent running with preset device-corresponding software specific to the state that is booted in accordance with the device; and a boot step of booting the device-corresponding software when the running program does not include the program unfit for concurrent running, and performing control so as not to boot the device-corresponding software when the running program includes the program unfit for concurrent running.

2. The boot control method according to claim 1, further comprising a step of booting the device-corresponding software after the program unfit for concurrent running is terminated.

3. The boot control method according to claim 1, further comprising:
   a step of determining whether to wait to boot the device-corresponding software when the running program includes the program unfit for concurrent running; and
   a step of booting the device-corresponding software after the program unfit for concurrent running is terminated if it is determined to wait.

4. A boot control apparatus comprising:
   an acquisition unit that acquires a state of a device when the device is connected to the boot control apparatus;
   a storage unit that stores information regarding device-corresponding software specific to the state that is booted in accordance with the device and information regarding a program unfit for concurrent running with the device-corresponding software;
   a search unit that searches for a running program that is running when the device is connected; and
   a boot unit that determines whether the running program includes the program unfit for concurrent running, boots the device-corresponding software when the running program does not include the program unfit for concurrent running, and performs control so as not to boot the device-corresponding software when the running program includes the program unfit for concurrent running.

5. The boot control apparatus according to claim 4, wherein said boot unit performs control so as to boot the device-corresponding software after the program unfit for concurrent running is terminated.

6. The boot control apparatus according to claim 4, wherein when the running program includes the program unfit for concurrent running, said boot unit further determines whether to wait to boot the device-corresponding software and, when it is determined to wait, performs control so as to boot the device-corresponding software after the program unfit for concurrent running is terminated.

7. A non-transitory computer-readable storage medium storing a computer program for controlling a computer to execute each of the steps of the boot control method according to claim 1.

* * * * *